United States Patent [19]
Searby

[11] Patent Number: 5,276,787
[45] Date of Patent: Jan. 4, 1994

[54] ELECTRONIC GRAPHIC SYSTEM

[75] Inventor: Anthony D. Searby, Newbury, England

[73] Assignee: Quantel Limited, Newbury, England

[21] Appl. No.: 510,162

[22] Filed: Apr. 17, 1990

[30] Foreign Application Priority Data

Apr. 17, 1989 [GB] United Kingdom ............... 8908612

[51] Int. Cl.⁵ ............................................. G06F 15/00
[52] U.S. Cl. .................................. 395/132; 395/128; 345/173
[58] Field of Search ............... 364/518, 521, 522, 200; 340/703, 706, 747, 750, 728; 395/133, 136, 139, 132, 128

[56] References Cited

U.S. PATENT DOCUMENTS

| | | | |
|---|---|---|---|
| 4,181,933 | 1/1980 | Benysek | 364/200 |
| 4,263,648 | 4/1981 | Stafford et al. | 364/200 |
| 4,970,664 | 11/1990 | Kaiser et al. | 364/521 |

FOREIGN PATENT DOCUMENTS

| | | | |
|---|---|---|---|
| 0219251 | 4/1987 | European Pat. Off. | G06F 15/72 |
| 0226959 | 7/1987 | European Pat. Off. | G06F 15/72 |
| 0228135 | 7/1987 | European Pat. Off. | G09G 1/16 |
| 0264099 | 4/1988 | European Pat. Off. | G09G 1/16 |
| 0283565 | 9/1988 | European Pat. Off. | G09G 1/16 |
| 2089625 | 6/1982 | United Kingdom | G09G 1/16 |
| 2187615 | 9/1987 | United Kingdom | G06F 15/72 |
| 2203318 | 10/1988 | United Kingdom | G06F 13/18 |
| 8504976 | 11/1985 | World Int. Prop. O. | G09G 1/16 |

Primary Examiner—Phu K. Nguyen
Attorney, Agent, or Firm—Cooper & Dunham

[57] ABSTRACT

An electronic graphic system for modifying image pixels includes a framestore 21 and a pipeline brush processor 22. Image pixels are read out of the framestore 21 in batches and applied to an input of the brush processor 22. Other data representing colour shape and pressure of a line drawn by a user on a touch tablet 17 by way of a stylus 18 is also input to the processor 22. As the pixels pass through the processor 22 they are modified by the other data. Batches of modified pixels are written back to the framestore 21. The reading and writing of pixels from the framestore 21 is interleaved with the reading of pixels for display as an image on a monitor 16. The system also includes an arrangement for interpolating stylus pressure to remove visible discontinuities or other changes in the drawn image resulting from significant changes in stylus pressure. An improved zoom facility enables a substantially continuously variable zoom factor to be defined thereby to avoid large changes in scale during a zooming operation. An arrangement for adjusting numerical values associated with some functions or features of the system allows the user to control the values solely by movement of the stylus over the touch tablet.

36 Claims, 5 Drawing Sheets

ELECTRONIC GRAPHIC SYSTEM

The invention relates to electronic graphic systems.

An electronic graphic system is described in our British Patent No. 2,089,625 and corresponding U.S. Pat. No. 4,514,818, the teachings of which are incorporated herein by reference. This graphic system is arranged to enable the painting or drawing of an image to be simulated electronically. The system includes a touch tablet and stylus combination by which a user can select from a range of notional drawing implements and a range of colours on a menued display for use in the simulated painting or drawing. As the stylus is moved over the touch tablet, circuitry within the stylus/touch tablet generates position signals representing the position of the stylus on the tablet. The selected implement will cover a patch of picture points in the image being produced, and as position signals are produced by the stylus/touch tablet new pixels are derived for every picture point in the patch covered by the implement. New pixels are derived by a processing circuit in response to the distribution of the patch of the selected implement, the selected colour, and to the old value of the pixel. The stylus is made to be pressure sensitive and to generate values representative of the pressure and this value is also used by the processing circuit to derive new pixels.

Pixels are stored in a suitable store, such as a framestore, and as the user, who it is envisaged will normally be an artist lacking experience in the use of computer based systems, manipulates the stylus on the touch tablet a patch of pixels is read from the store and modified by the processor to form a new patch of pixels which is written back to the store. This process is repeated continuously while the stylus is being manipulated on the tablet. The store is also read repeatedly and the pixels applied to a colour monitor to enable the creation of the picture to be observed substantially in real time.

It is important that the user should be able to view his creation in real time, i.e. with no discernible lag between movement of the stylus and the resulting image on the monitor. This is achieved in the original "PAINTBOX" (Registered Trade Mark) system (available from the assignee of the application) by processing all pixel patches generated within a monitor frame period and writing the processed patches back to the store within a frame period, at least when the time is averaged over a few frame periods. However, in some circumstances, such as for example a signature which is naturally drawn quickly, operations in the system may lag behind operations of the user which can be distracting to the user.

The present invention aims to provide an improved system in which processing speed is increased to remove any discernible lag between the user and the display thereby to provide for uninterrupted use of the system by the user.

Therefore, in one aspect the invention provides an electronic graphic system in which image data stored in a store in the form of pixels representing an image is read from the store in batches of pixels, each pixel in the read batch being delivered in sequence to a processor for modification with pixels also being read serially from the store for display, and modified pixels output from the processor are written back to the store in batches, the arrangement of the system being such that the reading and writing of batches of pixels from and to the store is interleaved with the reading of pixels for display.

In another aspect the invention provides an electronic graphic system in which image data stored in a store in the form of pixels representing an image is selectively read from the store for modification by a pipeline processor arranged such that successive steps in the modification process are performed substantially simultaneously on a plurality of consecutive pixels read from said store, the modified pixels subsequently being written back to said store.

Another problem that can arise when the stylus is moved quickly across the touch tablet by the user, is that co-ordinate positions identified by the touch tablet can become quite widely spaced, relatively speaking. This in itself does not cause discontinuities in the image because the resolution of co-ordinate positions generated by the touch tablet is greater than the resolution of pixels in the image. However, when such movement is combined with significant changes in stylus pressure the result may be a visible discontinuity or change in the drawn image as displayed on the monitor.

Another feature of the present invention resides in the realisation that the problem of discontinuities or other changes in the drawn image resulting from significant changes in stylus pressure can be overcome by interpolating pressure values over the length of a line.

Thus, in another aspect the invention provides an electronic graphic system for modifying image pixels, the system comprising a stylus and touch tablet combination for generating co-ordinate data and for generating pressure values representative of the pressure applied to the stylus from time to time, and a processor responsive to said co-ordinate data for selecting pixels to be modified and being arranged to interpolate between a first pressure value at a first instant and a second pressure value at a second instant and to modify the selected pixels in accordance with the interpolated pressure values.

In the abovementioned "PAINTBOX" system options, features and modes of operation are selected from a menu displayed on the monitor. The system is arranged so that the user can cause the menu to be displayed by rapidly moving the stylus over the edge of one or other side of the touch tablet's working area. Once the menu is being displayed, the user can select from the available options by moving the cursor over the desired option. Some features are simply selected either as ON or OFF by pressing firmly down with the stylus while the cursor is over the desired feature, the system responding by changing the feature between ON and OFF as appropriate. Other features are selected as a numerical value from within a predefined range of values, e.g. 0% to 100%, and in hitherto known systems these features have been selected by first moving the cursor over the desired feature and pressing firmly down with the stylus and then inputting the desired value either through a separate keyboard or an equivalent to a keyboard displayed on the menu. The need to use a separate means to input the numerical value tends to slow down use of the system and thus hinder the user.

The present invention aims to overcome this problem by providing an electronic graphic system for modifying an image stored in a store, in which system a user selectable menu is displayable on a portion of a display screen, the menu displaying representations of user alterable features associated with the modification of the image, wherein a feature is selectable by placing a cursor over the representation of that feature and is alterable by subsequent movement of the cursor on the display screen.

Video graphic systems often include a zoom facility which can be selected to expand or compress an image displayed on the monitor. When the zoom facility is used to expand or magnify the image, only a selected area of picture points in the store are read and displayed on the monitor. In order to effect magnification each picture point within the area is read more than once so that the pixel is displayed over an area of a number of picture points on the monitor. When the zoom facility is used to compress or reduce the image, the number of pixels is reduced by for example averaging a number of picture points to produce a single pixel which is output for display. In each case a zoom factor controls the reading of pixels from the store and the displaying of pixels on the monitor. In hitherto known systems, the zoom factor has been defined as an integer and as a result the magnification or reduction cannot be changed smoothly. Instead, the first available zoom factor has been ×2 giving a doubling or halving in the size of the displayed image. This is quite a harsh magnification or reduction and the use of integers to define the zoom factor also causes an image to step jerkily through a zoom.

The invention further aims to provide an improved system in which a zoom factor can be defined as a substantially continuously variable value such that large changes in scale can be avoided and smooth changes in the image during a zoom can be effected. To this end the invention in another of its aspects provides an electronic graphic system for producing a zoom effect on an image for display, in which system pixels representing an image are stored in a store and an addressing reduction circuit responsive to a predefined zoom factor in a range from zero to unity reduces the rate at which locations in the store are addressed in relation to the rate at which pixels are read from the store for display.

Also to this end the invention provides an electronic graphic system for producing a zoom effect on an image for display, the system comprising a store for storing pixels representing the image with locations in the store being read at a clock rate N, and a zoom controlling circuit responsive to a user definable zoom factor in the range N to 0 for controlling the addressing of locations in the store such that locations are addressed at a rate M determined by the zoom factor, where $M \leq N$.

The above and further features of the invention are set forth with particularly in the appended claims and together with advantages thereof will become clearer from consideration of the following detailed description of exemplary embodiments of the invention given with reference to the accompanying drawings.

DETAILED DESCRIPTION OF THE EMBODIMENTS

Figure 1:
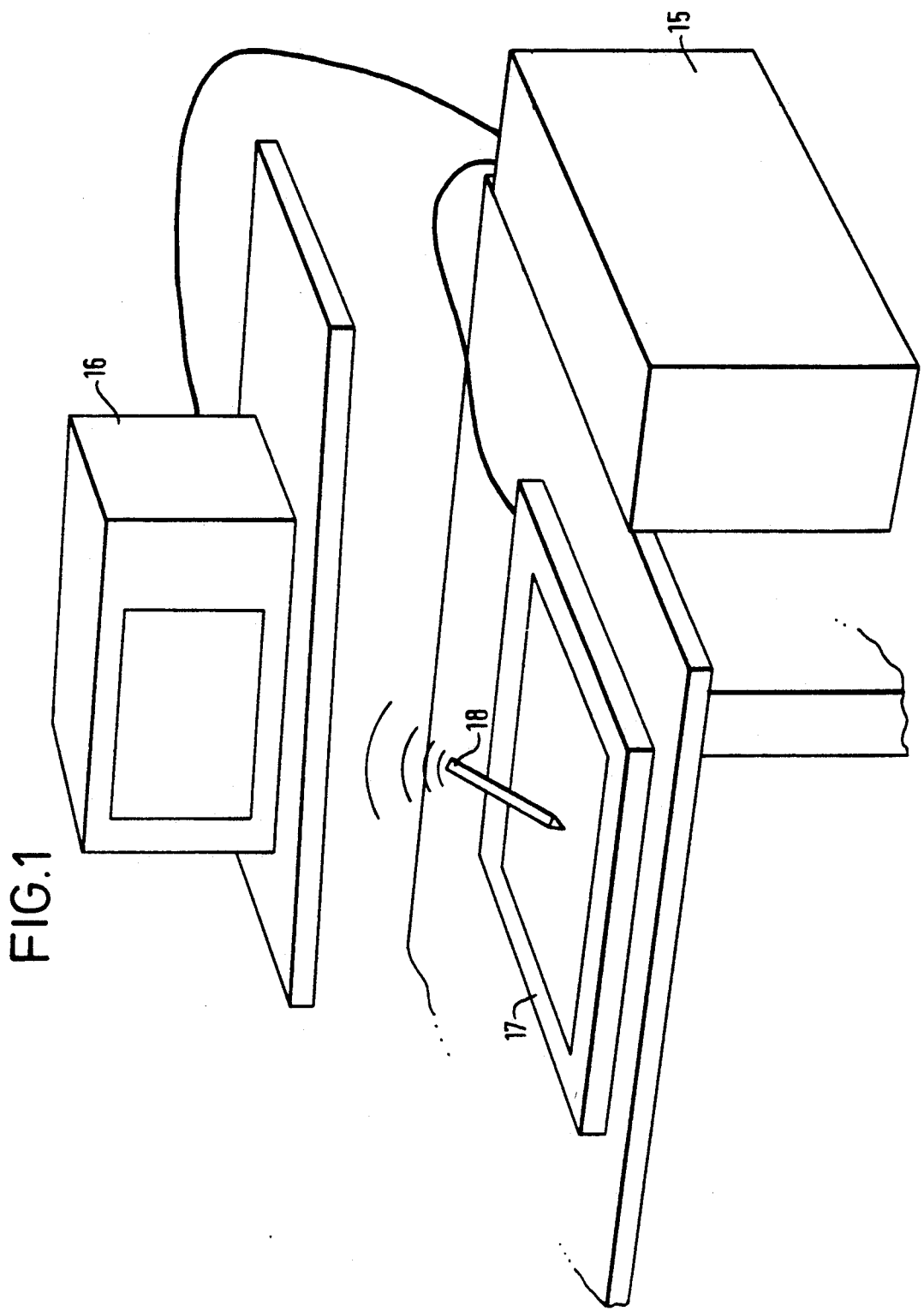
FIG. 1 shows a video graphic system.

Referring first to FIG. 1 of the accompanying drawings a video graphic system 10 is shown having a processing and storage unit 15, a colour (television type) display monitor 16, a touch tablet 17 and a stylus 18. As will become clearer from the description that follows, the processing unit 15 includes a disc drive for storing image data and programs, dynamic random access memory devices (DRAMs) for storing image data, a housekeeping processor, a brush processor, filters and special effects processors.

A memory device in unit 15 stores digitised pixel data for a full video frame, which is read at full video rate to produce a video signal for the monitor 16. In addition, the data held in this store may be modified in response to manual operation of the stylus 18 over the touch tablet 17. The stylus 18 radiates energy which is detected by the touch tablet 17 allowing circuitry in the touch tablet to determine whether the stylus 18 is in proximity, that is to say when the stylus 18 is within a predefined range from the touch tablet 17. When the stylus 18 is brought into proximity a signal is generated identifying the position of the stylus to a resolution greater than that of the pixel spacing of the video image. When in proximity, a cursor (in the form of a cross) is displayed on the monitor which then follows the movements of the stylus over the touch tablet.

The stylus 18 is also pressure sensitive and as it is applied to, i.e. brought into contact with, the touch tablet a pressure value is generated by circuitry within the stylus. This pressure value is supplied to circuitry within the touch tablet by radiating energy, modulated by a signal indicative of stylus pressure. A touch tablet and stylus combination capable of operating in this wireless mode is manufactured by Wacom KK of Japan. Thus, in response to modulated radiation from the stylus 18, the touch tablet 17 provides signals to unit 15 indicating (1) whether the stylus is in proximity, (2) its x and y co-ordinates within the working area of the touch tablet and (3) the manual pressure applied to the stylus by the operator; all without a physical link to the stylus. It is to be noted that in the stylus/tablet combination identified above, the stylus itself does not contain a source of energy but echoes radiation back from the tablet.

In addition to showing a full video image, the monitor 16 may also display menus which are called up by swiping the stylus over the edge of the working area of the touch tablet. A number of menus are available depending on the mode of operation of the system. From one of the available menus, the operation of painting may be selected, in which movement of the stylus 18 over the touch tablet 17 simulates the effect of conventional artists implements such as pencils, paintbrushes, air-brushes and chalks. Each implement can be selected by moving the stylus over the touch tablet so that the cursor is displayed over a box in the menu identifying the required characteristic and then applying pressure to the stylus. Once painting has been selected in this way, along with brush size and brush colour, a stroke may be made by the stylus which generates a sequence of co-ordinate location and brush pressure signals. A housekeeping processor in unit 15 re-constructs the stroke from these co-ordinate values and modifies evenly spaced, but overlapping, circular stamps of pixels within the memory device (framestore) for the displayed frame.

In the following description, in order to assist in the understanding of features provided in the embodiment, headings will be used to identify the start of the description of each feature.

PIPELINE PROCESSING

The procedure for recursive read-modify-write painting into a framestore is described in our abovementioned British Patent No. 2,089,625 and corresponding U.S. Pat. No. 4,514,818. In this procedure a new pixel value (P new) is written to each pixel location within a stamp derived from a previous pixel value (V old) a control value k determined by the form of the selected implement, and a new colour and intensity value (V new) in accordance with the following equation:

$$P\ new = k.V\ new + (1-k)V\ old$$

In areas where the stamps overlap, the pixel values (V old) will have been previously derived from this equation, resulting in a recursive modification of the stored value towards the brush colour providing inherently anti aliased lines.

A similar procedure is adopted in the system 10. However, in the system 10 the control value k is related to the pressure value obtained from the wireless communication between the stylus and the touch tablet. It should be noted that even though a position signal is generated by the touch tablet when the stylus is in proximity (as discussed above), pixels are not modified until pressure is applied to the stylus, because when no pressure is applied to the stylus k=0.

Operation of the classic "PAINTBOX" (Registered Trade Mark) design, is fast due to its "real-time" processing power. However, in some circumstances it is possible for the system to lag behind the operations of the artist. Such a lag can occur for example when the artist has, say, selected an implement covering a large area of pixels and moves the stylus quickly across the touch tablet. In these circumstances the number of pixels to be processed in a given period of time may be greater than that which hitherto known systems have been capable of processing in that time.

In order to improve the processing power of the system 10 and thereby to reduce detectable lag between movement of the stylus by the artist and the result of that movement appearing in the displayed image, the system 10 includes a pipeline processing arrangement. As will become clear from the following description, the pipeline processing arrangement improves processing power by accessing pixels, and performing a read-modify-write process, in batches of eight pixels to the image data in memory in response to manipulations of the stylus by the user. The processing is pipelined by way of a buffering arrangement so that a first batch may be processed while a second is undergoing memory transfer.

Figure 2:
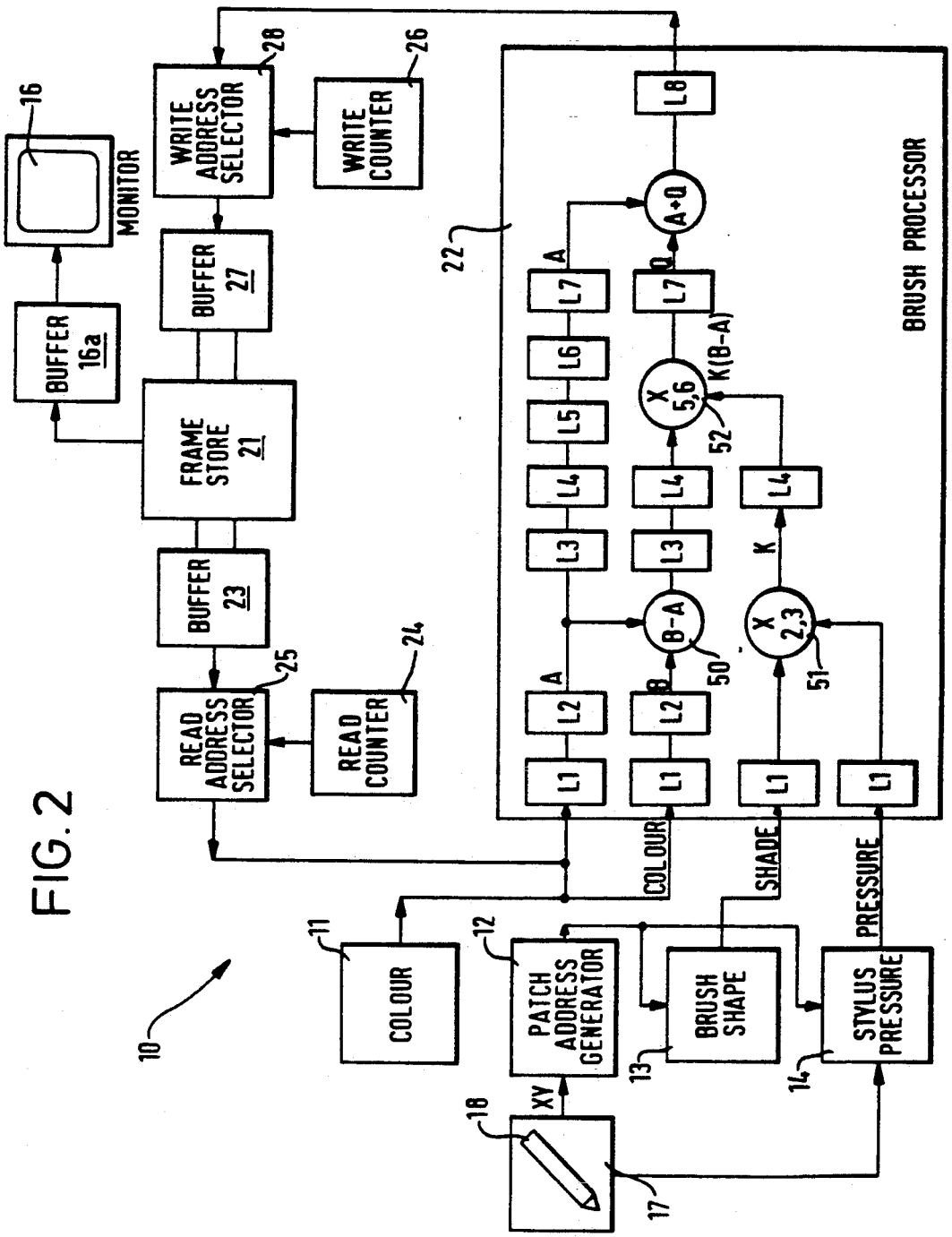
FIG. 2 is a schematic diagram of a processing circuit used in the system of FIG. 1.

Turning now to FIG. 2 of the accompanying drawings, the processing unit 15 of FIG. 1 includes a processing circuit, generally designated as 10, comprising a framestore 21, which may for example be a Dynamic RAM (DRAM) device, and a brush processor 22. A batch of image pixel data stored in the framestore 21 is read out into a buffer 23 and, as will be described in greater detail hereinafter, individual pixels in the batch are selected, under the control of a read counter 24, by a selector 25 for input to the brush processor 22.

The system 10 also includes a colour store 11 for storing data representing a user selected colour which colour data is delivered to the processor 22 along a line "COLOUR" in parallel with the pixel data input from the read address selector 25. When the stylus 18 is in the proximity of the touch tablet 17, the touch tablet generates co-ordinate data XY representing the instantaneous position of the stylus on the touch tablet. The co-ordinate data XY is input to a patch address generator 12 which converts the co-ordinate data XY into a patch of addresses which are used to address a brush shape store 13 and a stylus pressure store 14. The brush shape store 13 holds data defining a three dimensional shape representing a selected drawing implement and the stylus pressure store 14 holds instantaneous stylus pressure values from the touch tablet and stylus. Data from the brush shape store 13 and the stylus pressure store 14 are input to the processor 22 along the lines SHAPE and PRESSURE respectively.

The pixels input to the processor 22 from the read address selector 25 are each modified by the brush processor 22 and are output therefrom to be written back to the framestore 21 via a write address selector 28, under the control of a write counter 26, and a buffer 27. The write address selector 28 and the buffer 27 perform the reverse function to that of the buffer 23 and read address selector 25 in that the write address selector 28 receives modified pixels from the brush processor 22 and writes those pixels to the buffer 27 which delivers batches of pixels to the framestore 21.

It will be appreciated that the processing circuit 10 includes control and timing circuitry for supervising the transfer of pixels around the circuit. For the sake of simplicity the control and timing circuitry is not shown in FIG. 2. Clocking signals are used to control the operation of the processing circuit 10 and there follows a description of the operation of the processing circuit 10 in which pixel data transfers occur during particular clocking periods. It is to be appreciated that these clocking periods are defined by the above mentioned control and timing circuitry.

Figure 3:
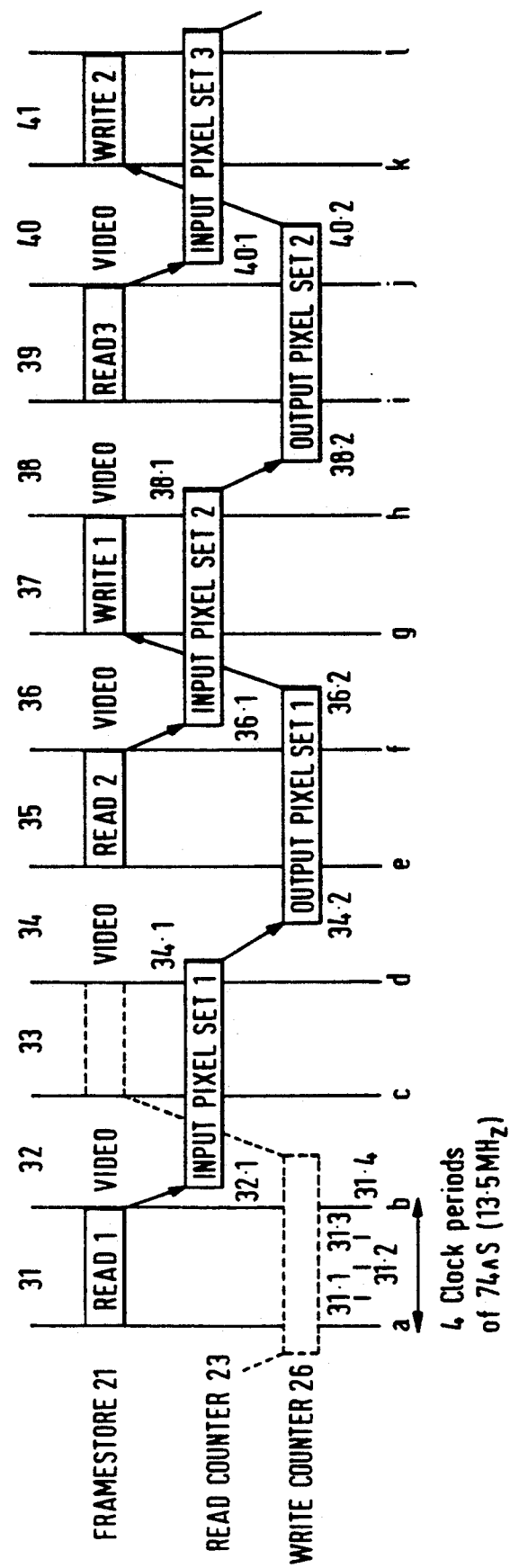
FIG. 3 is a timing diagram showing the timing of operations performed by the processing circuit of FIG. 2.

Turning now to FIG. 3 of the accompanying drawings, there is shown a timing diagram of the operation of the processing circuit 10.

The period between each vertical line (a,b,c ... k,l) in the timing diagram represents a group of four clock pulses of 74nS (13.5 MHz). Each period represents a time interval during which four pixels are required in order to generate an output for display on the monitor 16 at video rate. In order to prevent the monitor 16 from continuously requiring access to the framestore 21, and thereby preventing access to the framestore 21 by the brush processor 22 during alternative groups of four clock periods, e.g. 31-1 to 31-4, eight pixels are read from the framestore 21 to the monitor 16 via buffer 16a (this operation being identified by the word "VIDEO" on the line labelled "FRAMESTORE" in FIG. 3). This approach leaves alternate groups of four clock periods available for data transfer between the framestore 21 and the brush processor 22. In this way, reading of the contents of the framestore 21 by the monitor 16 and the brush processor 22 are interleaved between alternate periods. Eleven periods (31 to 41) of four clock cycles are identified in FIG. 3.

The operation of the processing circuit is as follows. During the first period 31 eight pixels of data are read in parallel from framestore 21 and supplied to the addressable buffer 23. This operation being represented by the legend READ 1. During period 32, after one clock period 32-1, the read counter 24 supplies individual addresses to the read address selector 25 which selects and supplies individual pixels to the brush processor 22 at the clock rate. The read counter 24 and read address selector 25 are arranged such that once a batch of eight pixels has been read to the buffer 23 the pixels are read out individually in order and are delivered to the brush processor 22 by the read address selector 25. The read counter 24 counts cyclically through a reading order to control the read address selector 25.

The brush processor 22 is configured as a pipeline of eight stages. In order to ensure that the various data input to the brush processor 22 arrive at the right place within the processor at the right time, each data transmission path within the processor is arranged to include eight stages of delay between the input to the processor and the output. The delay stages are implemented by either a single delay period latch (L1-L8) or a two delay period multiplier (M1,M2).

Pixels are input serially from the buffer 23 via the read address selector 25 to the brush processor 22. As each pixel is input at latch L1 the pixels previously inputted thereat move through the pipeline of latches such that the pixel previously in latch L1 is moved to latch L2, and so on. At the same time the data representing the user selected colour and shape, together with the data representing the pressure applied to the stylus, are input to the brush processor in parallel along the lines, COLOUR, SHAPE and PRESSURE respectively. As a pixel is clocked through the brush processor it is subtractively combined with the corresponding colour data by subtractor 50 and the shape data and pressure data are multiplied together by multiplier 51. The latches in the processor are arranged such that the sum B-A, where B=colour data and A=input pixel data, and the product K, where K=shape x pressure, are both delivered to multiplier 52 during the fifth and sixth clock periods and the product from multiplier 52 is delivered for addition to the original pixel data A. The resulting sum, represented as A+Q in FIG. 3 where A+Q=(1−K) A+KB, is output as a new pixel from the processor 22 via latch L8 during the eight clock period. Thus, pixel data input to the processor is modified by the processor 22 and is output therefrom eight clock periods later for delivery back to the framestore 21. It should be noted that the new pixel is therefore derived using the same form of algorithm as that discussed herein above, i.e. A+Q =KB+(1−K) A is of the same form as the above discussed equation P new=K. V new+(1−K) V old.

Referring to FIG. 3, during period 32, eight pixel values are read as VIDEO from the framestore 21 and buffered into buffer 16a to provide a continuous video signal for the monitor 16. Period 33 is used for writing previously processed data output from the buffer 27 back into the framestore 21. During period 33 read counter 24 continues to clock pixels to the brush processor 22, this operation being represented by the legend INPUT PIXEL SET 1 in FIG. 3. In period 34, a video access is again required and data is again output as VIDEO to the buffer 16a for display on the monitor 16. After the first clock cycle 34-1 of this period 34, all pixels have been read from buffer 23 in the INPUT PIXEL SET 1 operation and the first output pixel value thus becomes available at latch L8. Pixel values are output from latch L8 and are written to a buffer 27 via the write address selector 28 under the control of the write counter 26. The write counter 26 operates in a similar manner to the read counter 24 in that it counts cyclically through a write address sequence for the buffer 27. The operation of reading pixels to the write counter 26 is represented by the legend OUTPUT PIXEL SET 1 in FIG. 3, and this operation occurs during the period between the end of clock period 34-2 and the end of clock period 36-2.

At the start of period 35, two output values have been clocked into buffer 27 during the OUTPUT PIXEL SET 1 operation and therefore latches L1 and L2 are empty. A video access is not required during period 35, the video for this period having been read to buffer 16 during the previous period, and therefore a further eight pixels are read from framestore 21 and supplied to buffer 23, this operation being identified by the legend READ 2 in FIG. 3. During period 36, a video access is made and, at the end of the first clock cycle 36-1 pixels start to be read from buffer 23 and are supplied to the brush processor 22, this operation being represented by the legend INPUT PIXEL SET 2. By the end of clock cycle 36-2 all eight outputs from the OUTPUT SET 1 operation have been clocked to buffer 27. In period 37, the pixels of INPUT PIXEL SET 2 continue to be clocked into and through the brush processor 22 while the eight output pixels of OUTPUT PIXEL SET 1 are written to the framestore 21 (WRITE 1). During period 38, a video access is made and the last pixel of INPUT PIXEL SET 2 from the second read (READ 2) is supplied to the brush processor and the first two outputs of OUTPUT PIXEL SET 2 are supplied to buffer 27. Period 39 is equivalent to period 31, with READ 3 being processed in the same way as READ 1, and the whole process is thus repeated for further batches at pixels from the framestore 21.

The system 10 thus provides an arrangement by which the reading of pixel data for modification is interleaved with the reading of pixel data for display and in this way the effective speed of operation of the system is increased.

INTERPOLATING PRESSURE

As is described in the above mentioned British Patent No. 2,089,625 and corresponding U.S. Pat. No. 4,514,818, the PAINTBOX system is arranged to produce brush stamps, that is patches of pixel data, which are generated and stored in memory from time to time in response to co-ordinate position identified by the touch tablet. The resolution of the co-ordinate position identified by the touch tablet is usually substantially greater than that of the framestore 21 but if the stylus is moved quickly by an operator, coordinate positions identified by the touch tablet become quite widely spaced, relatively speaking, and are joined together by straight lines of overlapping stamps. The resolution of the stamp positions is greater than that of the pixel spacing because, for each position, the most appropriate pixel distribution is selected from a plurality of stored distributions, as described in the aforesaid patents. However, by the time a new co-ordinate value has been received, its associated pen pressure value may have significantly changed from that of the last value, producing a visible discontinuity or other noticeable change in colour density. In previous systems, this has not been a significant problem because fast operation of the system caused the machine to lag behind the operators movements, resulting in an avoidance on the part of the operator from moving in this way. Nevertheless, natural movements by the user of the stylus have been restricted in our previous systems by this limitation which is clearly undesirable insofar as it restricts the artistic freedom of the user. Furthermore, since the above described pipeline processor system can keep up with most operating speeds, discontinuities due to stylus pressure may become apparent.

Figure 4:
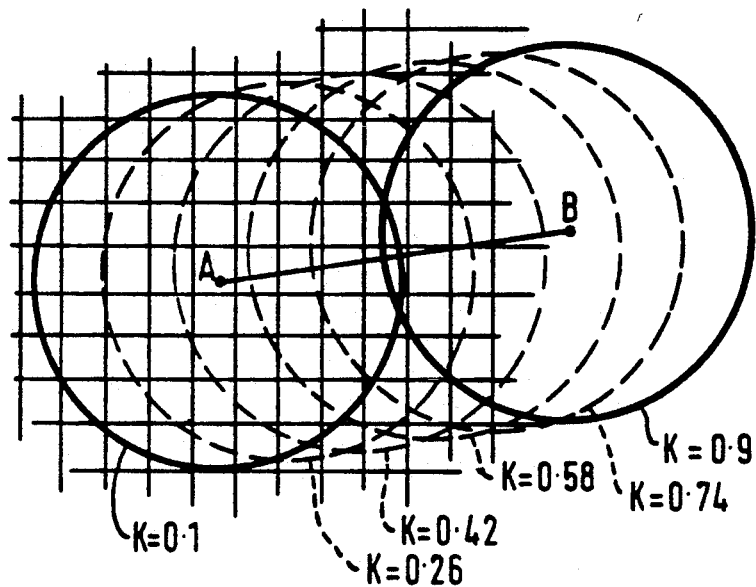
FIG. 4 is a representation of interpolated brush stamps.

The problem of discontinuities in stylus pressure is overcome in the present system by interpolating pressure values over the length of a line. For example, referring to FIG. 4 of the accompanying drawings, if it is assumed that the user artist moves the stylus 18 over the tablet 17 and the co-ordinates of points A and B are detected having associated stylus pressures of 0.1 and 0.9 respectively, then a jump from a k value of 0.1 to a value of 0.9 at adjacent stamps would produce a noticeable discontinuity in line density. However, the unit 15 of FIG. 1 also includes a processor which is arranged such that stamping does not commence from point A until the co-ordinates for point B have been received. Thereafter, the first stamp is applied (with k=0.1) and as further stamps are made k is linearly increased so that when a stamp is made for position B it has reached the value of 0.9 without introducing a discontinuity or other noticeable change in line density. In the simple example shown in FIG. 4, further stamps 61 . . . 64, represented by broken lines, with the values of k=0.26, 0.42, 0.58, 0.74 are created at regular intervals along the line between the stamps 60 and 65 at A and B. In this way, discontinuities in a line drawn by the artist are avoided and instead a line of smoothly changing density is created. Thus, the system is capable for responding to, and faithfully reproducing, naturally fast movement such as signatures, etc.

PEN OVER PICTURE TO CONTROL BOX VALUES

As previously mentioned herein, modes of operation can be selected from a menu called up by the user by swiping the stylus over the edge of the working area, that is to say moving the stylus quickly forward and over the edge of the touch tablet. Some boxes of the menu allow features or functions of the system to be selected in an ON-OFF fashion but others have numerical values placed therein. In the previous PAINTBOX systems, these values have been defined by the artist by way of either a physical keyboard or its equivalent defined in the menu area. This has tended to slow down and hinder the natural movements of the artist operating the system. The present system aims to overcome this problem by allowing the artist to control menu quantities by movement of the stylus over the display, and preferably over the image area, i.e. outside the menu area, during a menu feature selecting operation.

Figure 5:
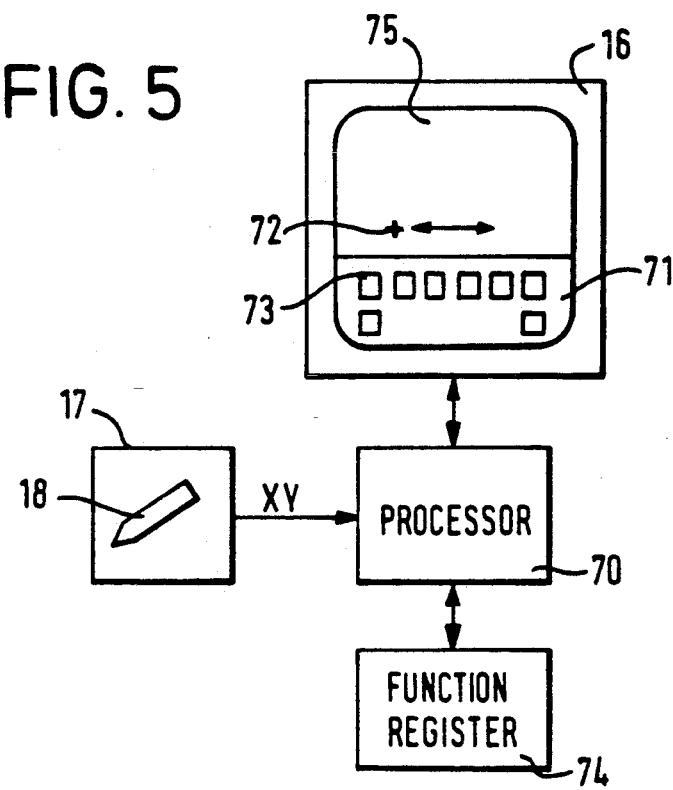
FIG. 5 is a schematic diagram of the system configured to enable menued features to be varied.

To achieve this, as shown in FIG. 5, a housekeeping processor 70 compares successive co-ordinate values and converts these values to produce numerical increments. First of all the artist selects the required menu, for example menu 71 which is displayed on a portion of the screen of the monitor 16. The artist then moves the stylus 18 over the touch tablet 17 until a cursor 72 lies above a box 73 in the menu 71. The box 73 represents a desired feature or function to be altered and displays a numerical value (not shown) representing the present value of that function. With the cursor 72 lying above the selected box 73 the artist then places the stylus into pressure, that is to say the artist applies pressure to the stylus. The housekeeping processor 70 responds to this by selecting the desired function or feature from a store 74 and informs the operator that the box 73 has been selected by changing colour, say from pink to green. The processor 70 is now ready to respond to movements of the stylus. The artist can move the cursor 72, by way of the stylus and touch tablet 17, 18, out of the menu 71 onto an image area 75 of the display and further movement of the cursor 72 on the display screen is interpreted by the processor 70 as a command to increase or decrease the value of the selected feature. For example, movement to the left L may be interpreted as a command to decrease the value and movement to the right R is a command to increase the value. Thus, by moving the stylus 18 so that the cursor 72 is outside the menu area, and by putting the stylus into pressure and moving it, the numerical value is decreased with movement to the left and increased with movement to the right.

Once the desired value has been obtained, the cursor 72 is moved into the menu area 71 again and placed into pressure with the cursor above the selected box. The processor 70 interprets this action as a command to stop adjustment of the selected feature and to store the new value in the store 74. The feature is then deselected by the processor 70 which indicates this by changing the colour of the selected box back to its original colour. Further features may then be selected by the artist, if so required, or the menu removed from the display, thereby returning the system to a drawing mode by swiping the stylus over the edge of the working area. It should be noted, that when a menu has been called, normal painting in the picture area is inhibited so adjusting parameters in the way described above does not cause unwanted lines to be placed into the picture.

OUT OF PROXIMITY TO CANCEL

Other features, provided from a displayed menu, allow geometric shapes to be drawn by defining a start point and an end point. It is not uncommon for mistakes to be made in defining the start point, which do not become apparent until the operator starts to define the end point and, in previous systems, the system could only be re-set, to the point of requiring a new start point, by swiping off. However, in the present embodiment, because the stylus and touch tablet produce different signals when the stylus is (1) applied to the touch tablet (co-ordinate data and pressure value data), (2) in proximity (co-ordinate data only) and (3) out of proximity (no data) the system is arranged to be re-set, when working in say a geometric shape mode, by moving the stylus out of proximity.

ZOOM

Figure 6:
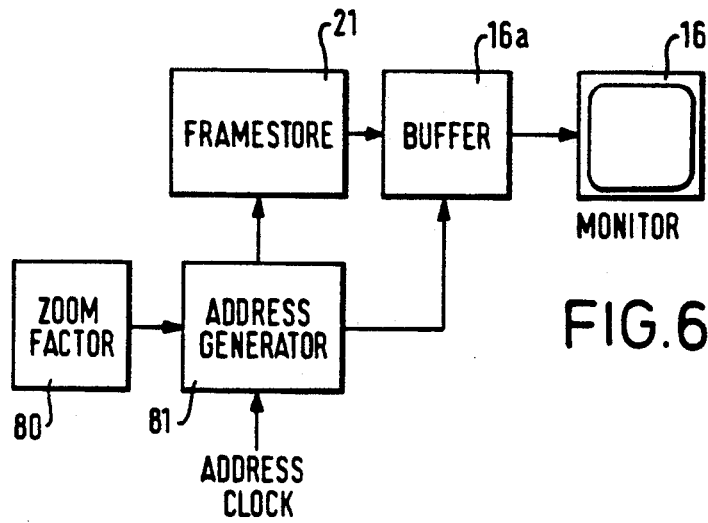
FIG. 6 is a schematic diagram of a prior art zoom circuit.

The unit 15 of FIG. 1 also includes a zoom facility arranged to modify the addressing of the framestore 21 so that pixels are addressed more than once allowing a selected region of the image to take up the whole of the monitor screen. An example of a prior art zoom circuit providing a zoom facility is shown in FIG. 6 of the accompanying drawings. In this circuit a zoom factor stored in a register 80 is used to control the addressing of a framestore 21 by an address generator 81. The register 80 stores integer values representing the zoom factor. When the zoom factor is set to unity a picture of normal or full size is output from the framestore 21 for display on the monitor 16. When the zoom factor is set to an integer value of two or higher the address generator responds by dividing an address clock signal by the value of the factor so that only a fraction of the area of the image is displayed. Signals are also output from the address generator 81 to the buffer 16a so that the area of the image output from the framestore 21 is displayed on the whole of the monitor screen 16. Thus, in known facilities the clock signal which increments the address generator is divided by the zoom factor, which may be increased by integer values from unity, but this results in a zoom facility which starts off in very large jumps, the first halving the area of the image displayed.

Figure 7:
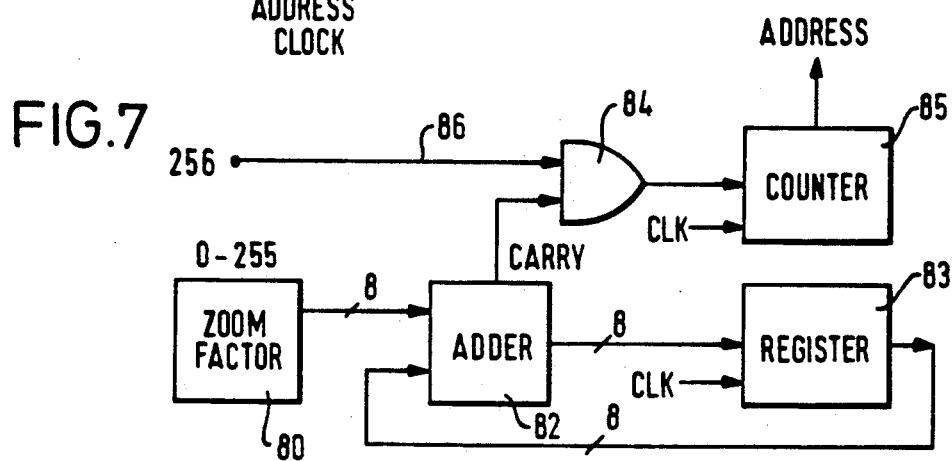
FIG. 7 is a schematic diagram of a zoom circuit used in the system of FIG. 1.

A circuit which provides an improved zoom facility is shown in FIG. 7 of the accompanying drawings and consists of a zoom factor register 80, an eight bit adder 82, an accumulation register 83, an OR gate 84 and a counter 85. The zoom factor may range from zero to 256, wherein 256 produces a picture of normal size by setting a ninth bit on line 86 which enables the counter 85 directly via the OR gate 84. The counter 85 outputs an address signal to the framestore 21 (not shown in FIG. 7). The address signal enables pixels to be read from addressed locations in the framestore and displayed on the monitor 16. When the counter 85 is enabled, by way of the enable signal from OR gate 84, the output address signal is advanced by one increment each time the counter receives a clock pulse. When an enable signal is not applied to the counter, the address remains the same and the same pixel at the same address is read from the framestore 21 in the next clock cycle.

For zoom factor values less than 256, counter 85 is enabled when the eight bit adder 82 produces a carry signal. The adder 82 receives a signal representing the zoom factor from the zoom factor register 80 and adds that to a signal representing a number stored in the accumulator register 83. The sum output from the adder 82 is output for storage in the accumulator register 83 and this process is repeated for each clock cycle. A carry signal is output from the adder 82 each time the sum of the zoom factor and the register 83 contents exceeds 255. The carry signal is applied via the OR gate 84 to enable the counter 45.

Thus with a zoom factor of 255, say, the degree of magnification is 256/255, and it is not until the factor becomes as low as 128 that the degree of magnification becomes ×2 (i.e. 256/128). The circuit shown in FIG. 7 therefore produces a much more gradual zoom than that available using hitherto known techniques. When zoomed, the picture may be scrolled by fractions of a pixel by pre-loading the accumulation register 83 with a value derived via a selector multiplied by a value from the register and the start of each line.

DISPLAYING SPLINES BY DOTS

The system is also capable of displaying curves constructed form positions identified by the operator.

Figure 8:
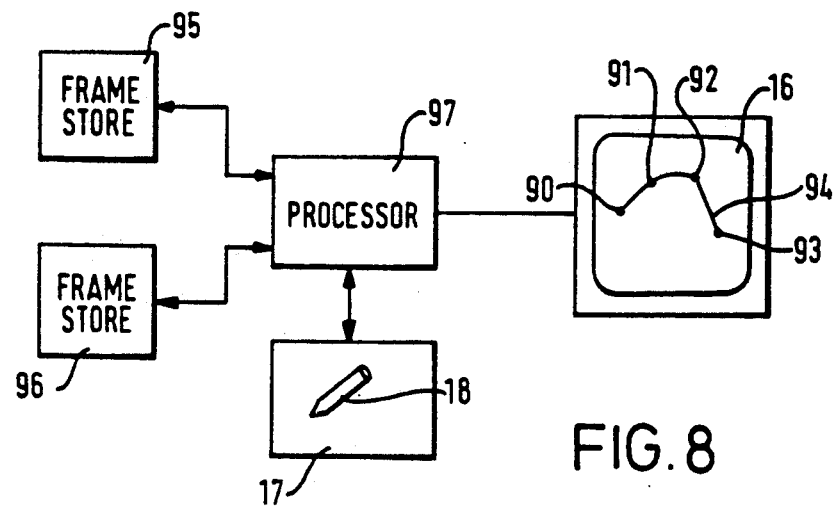
FIG. 8 is a schematic diagram of the system configured to display a user definable line.

Referring now to FIG. 8 which shows an exemplary display on the monitor 16, from: the identified positions 90 ... 93, a curved line 94 is calculated as a mathematical expression (such as a polynomial) which intersects all the positions 90 ... 93. The system then calculates new points, so that the line 94 may be displayed as a series of evenly spaced dots Each dot may be positioned at a higher resolution than the pixel spacing using the technique described in the aforesaid patent and outlined above.

As also shown in FIG. 8, a process of double buffering is used in which a first framestore 95 is updated while a second framestore 96 provides a video signal for the monitor 16. The artist can define points by way of the stylus 18 and touch tablet 17 and a processor 97 responds to signals from the stylus by drawing data representing a line joining the identified positions into the first framestore 95 during a first display frame period. During the next displaying frame period the data is output from the first framestore 95 for display of the line on the monitor 16 and data representing the line joining new identified positions is drawn into the second framestore 96. The role of the two stores 95, 96 alternates on a frame-by-frame basis so that the data output to the display 16 is constantly updated but without introducing any flickering to the displayed object.

By displaying the line 94 as dots, the data content of the image can be reduced thereby allowing the displayed line to respond to new points in real time. The displayed line will therefore be seen to twist and reconfigure in response to movements of the stylus allowing an artist to create smooth lines connecting previously defined points on an image. Once the desired line has been designated, it can be drawn into an image as a solid line formed from overlapping brush stamps at positions defined by the equation.

STICKING CUT-OUTS WITHOUT A FLASH

A known feature of video graphics systems is the so called cut and paste, in which part of one image is stamped into a second image. To avoid introducing artefacts, stamping is controlled by a soft edged stencil, as described in U.S. Pat. No. 4,602,286 assigned to the present Assignee and included herein as part of the present disclosure. Before a cut out is permanently stamped, it may be keyed over the background using a video combiner allowing it to be positioned in response to movements of the stylus. Selecting "stick" from a displayed menu then permanently sticks the cut-out which takes a minimum of two frame periods.

A problem with known systems is that, unless the combiner is disabled (resulting in the cut out being removed and re-assembled during the stick process) the stencil signal is used twice, once in the sticking process and once again as the video key. The effect is to produce a hard edge which may be seen by an operator as a flash while the image is being stamped. The present system overcomes this problem by simultaneously writing pixel data produced by the stick routines into the corresponding locations of the cut-out store. Thus, at these pixel positions, the video key has no effect because both the background and the cut-out have the same value and any proportions (defined by k and 1−k) of equal values combined by the equation defined above produces the same result. Thus, a stick need not be instantaneous and no disturbances are produced in the output image.

Having thus described the present invention by reference to a preferred embodiment it is to be well understood that the embodiment in question is exemplary only and that modifications and variations such as will occur to those possessed of appropriate knowledge and skills may be made without departure from the spirit and scope of the invention as set forth in the appended claims and equivalents thereof.

I claim:

1. An electronic graphic system comprising:

a store for storing a plurality of pixels representing an image;

a display for displaying the image;

a processor for performing a modification proceeds to create modified pixels;

a reading means connected to the store for reading batches of pixels comprising some of said plurality of pixels from the store and selectively delivering the batch, a pixel at a time, to the processor and to the display;

a writing means connected to the processor for receiving modified pixels therefrom to form a batch of modified pixels and for writing the batch of modified pixels to the store, and wherein the pixels forming said plurality of pixels are stored in the store in a known order and the reading means reads the plurality of pixels from the store in said order for delivery to the display to display the image represented thereby, and the reading means and the writing means interleave the reading and writing of batches of pixels to and from the processor and the reading of pixels for delivery to the display.

2. An electronic graphic system as claimed in claim 1, wherein the processor comprises a pipeline processor in which the modification process is divided into a sequence of successive processing steps which are performed concurrently.

3. An electronic graphic system as claimed in claim 1, wherein the reading means deliver pixels in the batch to the processor in a sequence related to the known order, and the writing means writes the processed pixels back to respective locations in the store.

4. An electronic graphic system as claimed in claim 1, wherein the reading means comprises a read buffer for reading and buffering said batches from the store and a read address selector which, under the control of a read counter, delivers pixels serially from the read buffer to the processor.

5. An electronic graphic system as claimed in claim 1, wherein the writing means comprises a write buffer for writing batches of modified pixels to the store and a write address selector which, under the control of a write counter, delivers modified pixels serially from the processor to the write buffer.

6. An electronic graphic system as claimed in claim 1 further comprising manually operable input means for generating co-ordinate data representing locations in the image at which pixels are to be modified and color selecting means for selecting a color, the processor being arranged to produce modified pixels as a weighted combination of data representing a selected color and pixels read from said store.

7. An electronic graphic system as claimed in claim 6, wherein the manually operable input means comprises a touch tablet and an associated stylus wherein to the touch table causes generation of the co-ordinate data, and pressure of the stylus on the touch tablet is converted into a pressure value which is used in the combining of said color data and said pixels.

8. An electronic graphic system as claimed in claim 1, further comprising a monitor for displaying the image represented by the pixels in the store.

9. An electronic graphic system as claimed in claim 1, wherein the store comprises a dynamic random access memory store.

10. An electronic graphic system as claimed in claim 1, wherein a double buffering arrangement is formed by dividing the store into a first part and a second part, in which image data related to a first image frame is held in the first part and image data relating to a second image frame is held in the second part, the system further comprising:

display means for displaying in a first frame period the first image frame and for displaying in a second frame period the second image frame;

user operable location defining means for defining plural locations in the first and second image frames;

calculating means for calculating data representing a smoothly changing curve connecting said defined plural locations and for modifying the data representing the first and second image frames therewith, the user operable means and the calculating means modifying data in the second store part during display of the first image frame and modifying data in the first store part during display of the second image frame.

11. An electronic graphic system as claimed in claim 10, wherein the curve is calculated as a polynomial.

12. An electronic graphic system as claimed in claim 10, wherein the curve is defined as a plurality of points connecting the locations.

13. An electronic graphic system as claimed in claim 10, wherein the store comprises a first part for storing said image and a second part for storing another image, the system further comprising:

means for storing a stencil image;

combining means for combining a portion of said image with a portion of said another image under the control of the stencil image, in combining means outputting the combined image for display and independently writing the combined image portion to one of said first and second store parts, thereby to eliminate disturbances otherwise caused in the combining of the images for display.

14. An electronic graphic system comprising:

a store for storing image data in the form of pixels representing an image;

reading means for selectively reading pixel data from the store;

a pipeline processor for performing a modification process on pixel data read by said reading means from the store, wherein the modification process is divided in said pipeline processor into a sequence of successive processing steps which are performed concurrently; and writing means for writing pixel data modified by said pipeline processor back to said store.

15. An electronic graphic system as claimed in claim 14, further comprising a stylus and touch tablet by which pixels to be modified are selectable and wherein the stylus is pressure sensitive and the processor is responsive to the pressure within a range of pressures applied to the stylus in the combining of the pixels and the user selected color.

16. An electronic graphic system as claimed in claim 14, further comprising a stylus and touch tablet by which pixels to be modified are selectable and wherein the stylus is pressure sensitive and the processor is responsive to the pressure applied to the stylus in the combining of the pixels and the user selected color.

17. An electronic graphic system for modifying image pixels, the system comprising a stylus and touch tablet combination for generating co-ordinate data and for generating pressure values which values are presentative of pressure applied to the stylus at respective times, and a processor responsive to said co-ordinate data for selecting pixels to be modified, said processor having means for interpolating between a first pressure value which is representative of pressure applied to the stylus at a first time and a second pressure value which is representative of pressure applied to the stylus at a second time and said processor further having means to modify the selected pixels in accordance with the interpolated pressure values.

18. An electronic graphic system as claimed in claim 17, in which the first pressure value and the second pressure value are pressure values generated at consecutive instants of time.

19. An electronic graphic system as claimed in claim 17, further comprising a framestore for storing said image pixels which are selectively read from the framestore to the processor for modification and modified pixels are written from the processor back to the framestore.

20. An electronic graphic system as claimed in claim 17 wherein the pressure values are interpolated linearly.

21. An electronic graphic system as claimed in claim 17, further comprising color selecting means for selecting a color and wherein the processor comprises means for modifying the selected pixels in accordance with the selected color.

22. An electronic graphic system as claimed in claim 17, wherein the processor comprises a pipeline processor in which the modification process is divided into a sequence of successive processing steps which are performed concurrently on consecutive pixels delivered thereto.

23. An electronic graphic system for modifying an image stored in a store and for displaying the image on a display screen, in which system a user selectable menu is displayable on a portion of the display screen, the menu displaying representations of user alterable features associated with the modification of the image and a user controlled movable cursor is displayed on the display screen, wherein a feature is selectable by placing said cursor over the representation of that feature and is alterable by movement of the cursor on the display screen once the feature has been selected.

24. An electronic graphic system as claimed in claim 23, wherein the cursor is movable over the display screen by way of a stylus and touch tablet combination, the system being arranged such that movement of the stylus on the touch tablet causes movement of the cursor on the screen and applying pressure to the stylus causes the desired feature to be selected.

25. An electronic graphic system as claimed in claim 24, wherein the stylus and touch tablet combination generates co-ordinate data representative of the pressure applied to the stylus, the system further comprising a processor arranged to receive said co-ordinate data and pressure value data and to modify the value of a selected feature in response to said received data.

26. An electronic graphic system as claimed in claim 23, wherein, once a feature has been selected, subsequent movement of the cursor in one direction causes the value of the feature to be increased and movement in another direction causes the value to be decreased.

27. An electronic graphic system for producing a zoom effect on an image for display, the system comprising:
a store providing a plurality of storage locations for storing respective pixels representing the image;
means for addressing the storage locations at an addressing rate and for reading pixels therefrom at a reading rate for display;
means for predefining a zoom factor in a range from zero to unity; and
an addressing reduction circuit responsive to the zoom factor for controlling the addressing means to reduce the rate at which storage locations are addressed as compared with the rate at which pixels are read from the store for display.

28. An electronic graphic system as claimed in claim 27, wherein the zoom factor is user definable.

29. An electronic graphic system as claimed in claim 27, wherein the addressing reduction circuit comprises a counting circuit for counting a number of clocking periods, which number is determined by the zoom factor, the counting circuit producing an output indicative of the counting of said number of periods; and an address incrementing circuit responsive to the output from the counting circuit for incrementing the addressed store location.

30. An electronic graphic system for producing a zoom effect on an image for display, the system comprising:
a store providing a plurality of storage locations for storing pixels representing the image;
means for reading locations in the store at a clock rate N;
user operable means for defining a zoom factor in the range N to 0; and
a zoom controlling circuit responsive to the user defined zoom factor for controlling the addressing of locations in the store such that locations are addressed at a rate M determined by the zoom factor, where $M \leq N$.

31. An electronic graphic system as claimed in claim 30, wherein the zoom controlling circuit comprises an adder connected to a register, the adder and the register being arranged such that the zoom factor is added to the contents of the register at the clock rate N and the adder generates a carry signal which is output to control incrementing of the address locations each time the contents of the registers exceed the maximum contents storable in the register.

32. An electronic graphic system as claimed in claim 31, wherein the carry signal enables an address counter the output of which is incremented at the clock rate N while the counter is enabled.

33. An electronic graphic system as claimed in claim 32, wherein the address counter is continuously enabled with the zoom factor is defined as the value N.

34. An electronic graphic system as claimed in claim 30, in which the image for display is displayed on a monitor display screen and a user selectable menu is displayable over a portion of the display screen, the menu displaying representations of user alterable features associated with functions for modification of the image and a user controlled movable cursor is displayed on the display screen, wherein a feature is selectable by placing a cursor over the representation of that feature and is alterable by movement of the cursor on the display screen once the feature has been selected.

35. An electronic graphic system as claimed in claim 34, wherein the menu includes a representation of the zoom factor.

36. An electronic graphic system as claimed in claim 35, arranged such that as the zoom factor is altered the zoom effect is applied to the displayed image.

* * * * *